United States Patent [19]
Hawk et al.

[11] 3,984,803

[45] Oct. 5, 1976

[54] SEISMIC INTRUSION DETECTOR SYSTEM

[75] Inventors: Hervey L. Hawk; James G. Hawley; John M. Portlock; James E. Scheibner, all of Albuquerque, N. Mex.

[73] Assignee: The United States of America as represented by the United States Energy Research and Development Administration, Washington, D.C.

[22] Filed: Sept. 6, 1967

[21] Appl. No.: 667,047

[52] U.S. Cl. .................. 340/16 R; 340/258 D;
340/261; 340/224; 340/412
[51] Int. Cl.² ............... G01S 3/80; G01D 21/04
[58] Field of Search ........... 340/258, 258 D, 261, 340/16 R, 224, 412

[56] References Cited
UNITED STATES PATENTS

| | | | |
|---|---|---|---|
| 3,171,108 | 2/1965 | MacKeen | 340/224 |
| 3,261,009 | 7/1966 | Stetten et al. | 340/261 |
| 3,296,587 | 1/1967 | Baker | 340/16 R |

*Primary Examiner*—Nelson Moskowitz
*Attorney, Agent, or Firm*—Dean E. Carlson; Dudley W. King; Richard E. Constant

[57] ABSTRACT

A system for monitoring man-associated seismic movements within a control area including a geophone for generating an electrical signal in response to seismic movement, a bandpass amplifier and threshold detector for eliminating unwanted signals, pulse counting system for counting and storing the number of seismic movements within the area, and a monitoring system operable on command having a variable frequency oscillator generating an audio frequency signal proportional to the number of said seismic movements.

8 Claims, 5 Drawing Figures

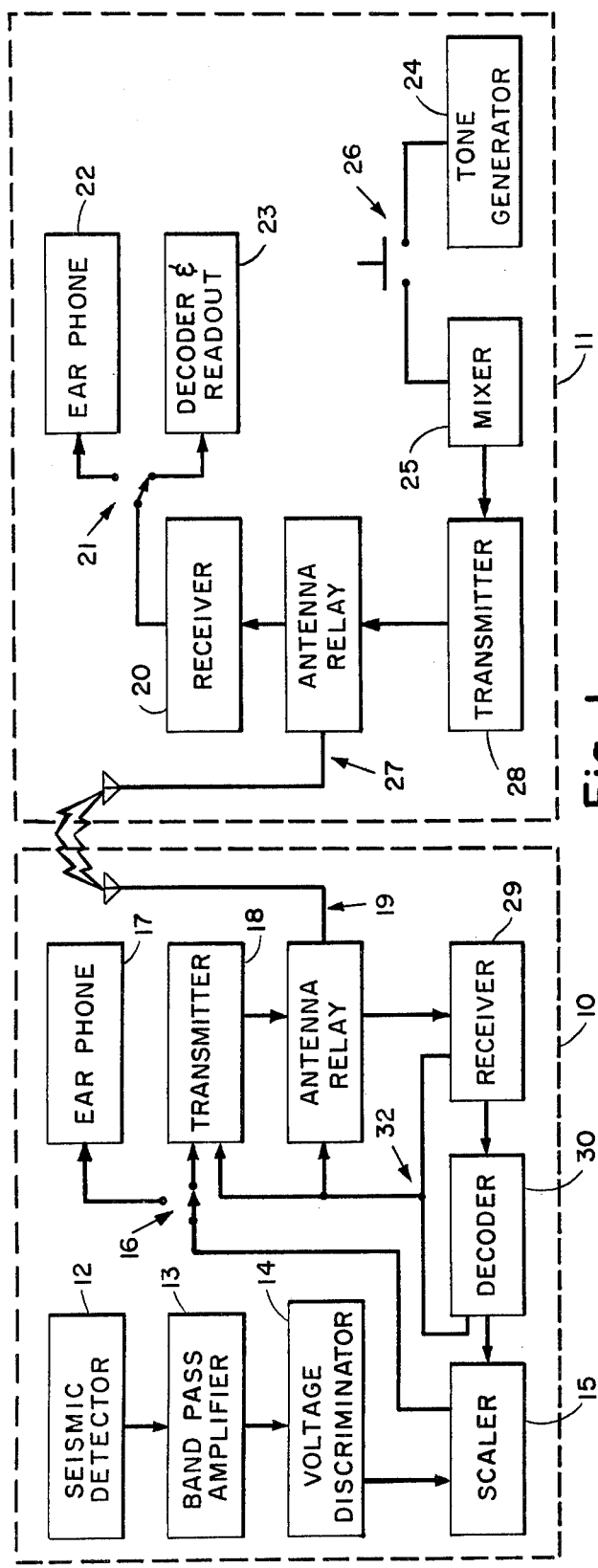
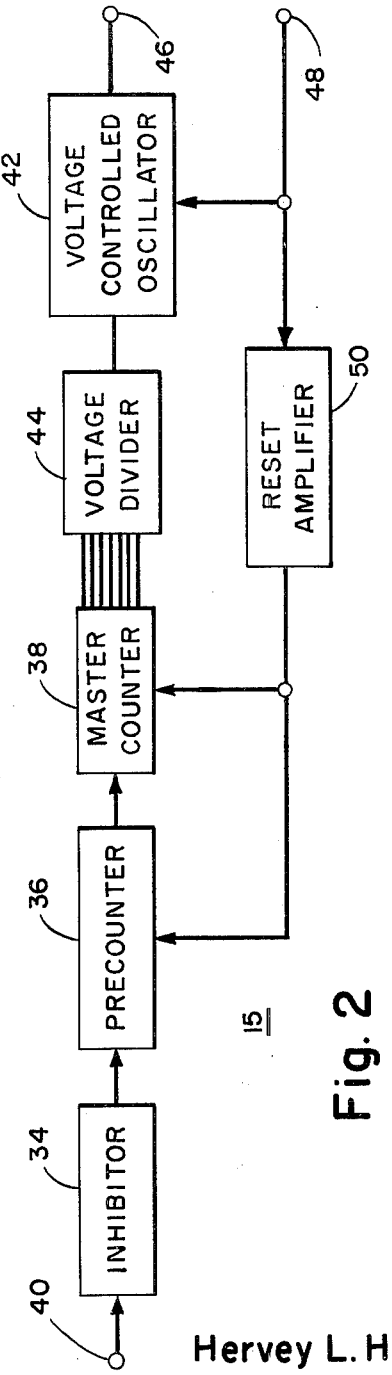
Fig. 1
Fig. 2
Hervey L. Hawk
James G. Hawley
John M. Portlock
James E. Scheibner
INVENTOR.
BY

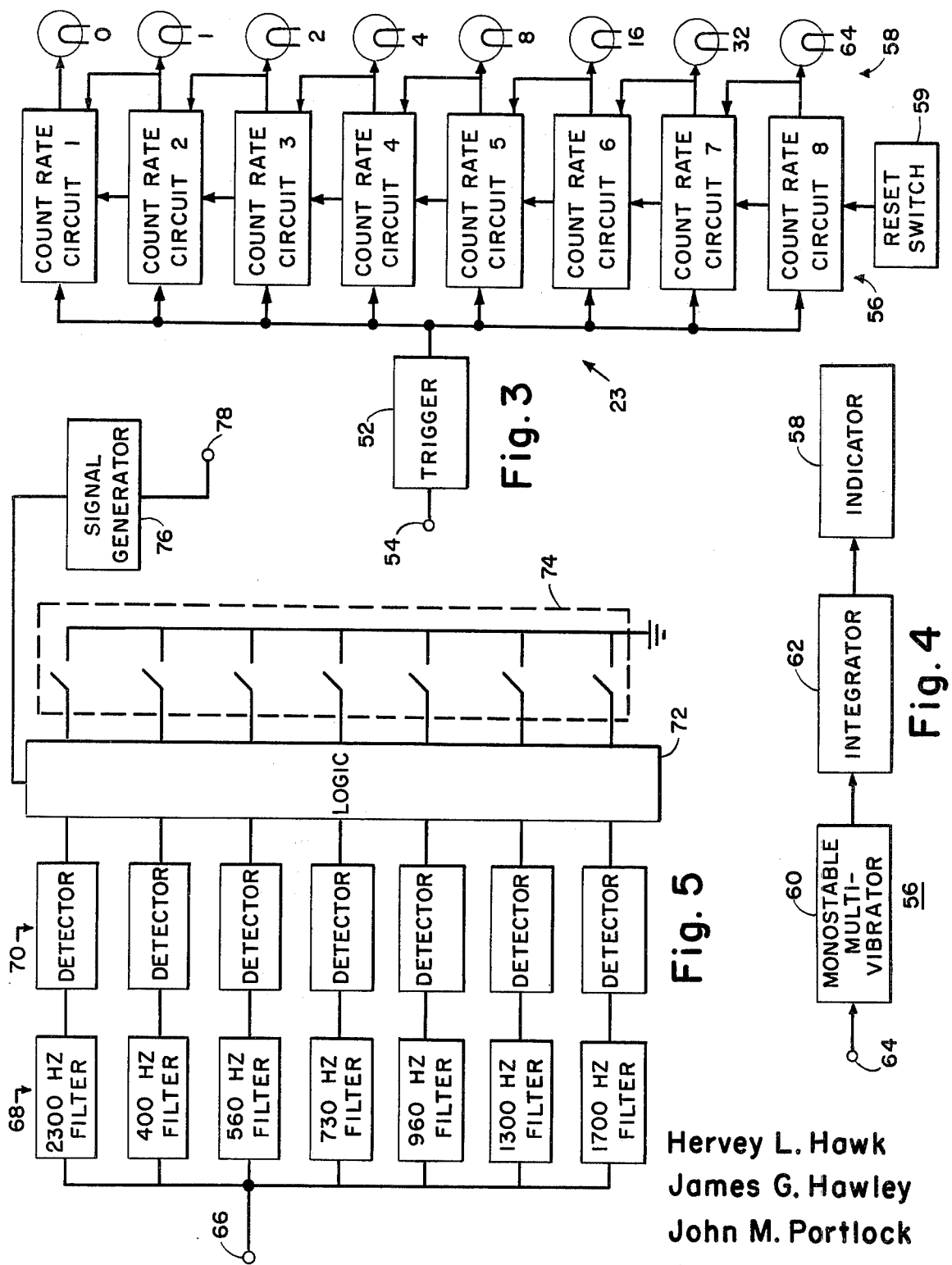

SEISMIC INTRUSION DETECTOR SYSTEM

BACKGROUND OF INVENTION

There are many applications for surveillance systems or devices for detecting or monitoring man-associated intrusions (such as personnel or vehicular traffic) within a control area, e.g. commercial establishments or private residences and security restricted or military areas. In many of these situations, a system which gives an indication of the number of intrusions in a real time readout operating mode (i.e. a continuous live monitoring operation) may be adequate. There are some applications, however, where the number of surveillance devices may be large or where the control area is remote or physically inaccessible to that it is not practical to provide a continuous real time monitoring of the devices. In these situations it would be desirable for the surveillance system to be capable of a command-readout mode of operation (i.e. the storage of information representing intrusions within the area of the device over any desired period of time and the production or broadcasting of the information upon interrogation of the device). In the latter type of operation, it may also be desirable that the device be subject to a coded command signal to prohibit unauthorized access to the information.

SUMMARY OF INVENTION

In view of the above, it is an object of this invention to provide a surveillance device for monitoring man-associated intrusions within a control area.

It is a further object of this invention to provide a surveillance system for detecting man-associated intrusions over a period of time within a control area and broadcasting the information on demand.

Various other objects and advantages will appear from the following description of one embodiment of the invention, and the most novel features will be particularly pointed out hereinafter in connection with the appended claims.

The invention comprises a surveillance device including means for generating an electrical signal in response to seismic movement of the generating means, bandpass amplifier coupled to the generating means, threshold detector means for passing signals from the amplifier exceeding a preselected voltage level, means for counting and storing said signals, variable frequency oscillator means for generating and transmitting on demand an audio signal representing the number of man-associated seismic movements detected by said device and means for monitoring the audio signal.

DESCRIPTION OF DRAWINGS

The present invention is described in the accompanying drawings wherein:

FIG. 1 is a block circuit diagram of the surveillance system of this invention;

FIG. 2 is a block circuit diagram of the scaler shown in FIG. 1;

FIG. 3 is a block circuit diagram of the intrusion information decoder shown in FIG. 1;

FIG. 4 is a block circuit diagram of a count-rate circuit which may be used in the circuit shown in FIG. 3; and FIG. 5 is a block circuit diagram of the command signal decoder shown in FIG. 1.

DETAILED DESCRIPTION

Seismic disturbances or movements may be measured down to very low frequencies (below 5Hz) and amplitudes with variable reluctance detectors known commonly as geophones. Conventional geophones utilize a magnet and coil movable with respect to each other to provide a signal at the same frequency and proportional in amplitude to any seismic movement sensed by the geophone. Output signal levels from standard geophones may range down to −80 dbv or less. These geophones are commercially available such as Model HS-1 from Hall-Sears, Tulsa, Oklahoma.

It has been discovered that man-associated disturbances are typified by a seismic signature having relatively narrow spectral contents, predominately in the 10 to 40 Hz band. This may be contrasted with microseisms and other random background noise which exihibit relatively broad, smooth spectral contents ranging from less than $10^{-2}$ Hx to greater than 100 Hz. The component of such background noise existing in the 10 to 40 Hz band is 10db or more below the desired seismic signature under normal conditions. However, this level may be greatly dependent on the locals, weather, soil conditions and time of day.

The seismic signature of a footstep is typified by several cycles at the center of the spectral peak. The duration of the resultant envelope is typically 0.1 to 0.2 seconds. Since a normal walk is about 2 steps per second, one person may produce seismic vibrations for about 0.4 of each second. At a given footstep detection range of the geophone, the number of steps a person takes in crossing the range of the instrument may be approximated. The surveillance system of this invention has shown the capability of detecting a person walking quietly up to about one hundred yards. However, for purposes of description of the invention, it will be assumed that a person walking by the device will take about 32 steps within the range of the geophone. It will be apparent from the description hereinafter, that any convenient number of steps may be chosen within the principles of the invention.

Vehicular activity produces seismic signatures having strong components in the bandpass of interest and may be detected by this system.

FIG. 1 illustrates a seismic surveillance system which may be used in a command readout mode and which includes a detector unit 10 and an interrogator unit 11.

Detector unit 10 includes a conventional geophone seismic detector 12 as described above coupled to bandpass amplifier 13 which filters out undesired frequencies and threshold detector or voltage discriminator 14. Geophone 12 may generate electrical signals representative of and responsive to any seismic movement of the geophone. Bandpass amplifier 13 amplifies and passes any electrical signals generated by geophone 12 which are within the desired seismic signature bandpass, such as between about 10 to 40 Hz. Discriminator 14 may produce or pass a pulse proportional to and coincident with the first cycle of any electrical signal representing a seismic signature which exceeds a given voltage or threshold level representative of normal seismic background noise or signals. The discriminator threshold level or bandpass amplifier gain may be adjusted to vary the range of sensitivity of detector unit 10. The voltage pulse output of discriminator 14 may be fed to scaler means 15. The output of scaler means 15 may be an audio frequency signal having a frequency proportional to the total pulse count as will be described more fully with respect to FIG. 2. The audio frequency signal output may be coupled through switch 16, upon inerrogation of the unit as described below, to any suitable audio output such as a speaker or earphones 17 or to a conventional AM or FM modulator and transmitter 18 and radio wave transmitting and receiving system 19, depending on the physical accessibility of the detector unit 10. Transmitting and receiving system 19 may include an antenna and an antenna relay as shown. Modulator and transmitter 18 modulate the carrier radio wave in accordance with the audio frequency signal.

Interrogator until 11 includes a radio wave transmitting and receiving system 27 similar to system 19 which may receive the modulated carrier wave and couple the same to a radio wave receiver and demodulator 20. The demodulator audio frequency signal may in turn be coupled through switch 21 directly to a suitable audio output device such as a speaker or earphones 22 or to a decoder and readout circuit 23. Decoder and readout circuit 23 will be described more fully with respect to FIG. 3.

Detector unit 10 may be interrogated by unit 11 by sending a coded radio wave signal through transmitting and receiving systems 20 and 19. The coded radio wave signal may be generated by a suitable coding system such as by tone generator 24, code selector or mixing amplifier 25 and a suitable selector switch 26, shown schematically as a single switch for purposes of illustration. Tone generator 24 may include a plurality of suitable oscillators such as voltage controlled oscillators or crystal controlled oscillators set at preselected frequencies. Typical code frequencies may be about 400,560,730,960,1300,1700 and 2300 Hz. Depending on the particular detector unit being interrogated and the preselected code for that unit, any combination or number of code frequencies may be selected by switch 26 and mixed and amplified in mixer 25. The mixed multifrequency signal or composite waveform may then be fed to modulator and transmitter 28. The appropriately modulated radio frequency carrier wave may then be transmitted to detector unit 10 by transmitting and receiving systems 27 and 19. The modulated radio wave signal received by system 19 may be coupled to demodulator and command receiver 29. The demodulated multifrequency signal having the frequencies selected by switch 26 and mixer 25 may be sensed by decoder 30 to determine if the proper code or combination of frequencies which were previously "wired in" decoder 30 have been received. If the proper code is received, scaler 15 may be instructed to transmit its present count to interrogator unit 11 and the appropriate audio output device.

In order to conserve power in detector unit 10, which under most remote operating conditions would be powered by a conventional battery or storage type power supply, various components or circuits within the unit may be disconnected from the power supply (not shown) during particular periods of the operating cycle. For instance, when detector unit 10 is in a normal seismic movement sensing mode and the interrogator unit 11 is not monitoring the scaler 15 count, modulator and transmitter 18 may be disconnected from the power supply. When the proper code is received by decoder 30, an enabling signal may be generated be decoder 30 and transmitted by conductors 32 which applies power to modulator and transmitter 18, connects the transmitter to system 19 and removes power from command receiver 29. The enabling signal may be generated for a predetermined time so as to permit the transmission of the scaler count and then removed to allow the unit 10 to return to its normal sensing mode with the transmitter turned off and the receiver turned on and connected to system 19.

The individual circuits preferably are designed so as to require minimum operating current at all times, particularly when a particular circuit may be in a quiescent or nonfunctioning mode.

Scaler 15, as shown in FIG. 2, includes in its normal sensing mode an inhibitor 34, a precounter 36 and a master counter 38. Inhibitor 34 may be connected through terminal 40 to the output of discriminator 14. When discriminator 14 produces an initial output pulse representing a seismic movement sensed by detector 12 having the proper frequency and amplitude as determined by bandpass amplifier 13 and discriminator 14, inhibitor 34 may trigger precounter 36. Inhibitor 34 may be adjusted, such as by adjusting an RC circuit period, to prevent generation of a pulse input to precounter 36, after the initial pulse has been received, for a preset period depending on the particular man-associated seismic movements which it is desired to count, in the case of personnel movements, the period may be about 0.2 second or about the duration of seismic movements produced by a footstep. Any pulses received during this period may be blocked from reaching precounter 36 by inhibitor 34. After the preset period, a further initial pulse may trigger inhibitor 34 and precounter 36 and repeat the cycle. Thus, precounter 36 may count only those seismic movements which are separated by at least the preset period, such as every 0.2 second.

Precounter 36, may be adjusted to count the preselected number of seismic movements that a man-associated intrusion would generate in passing across the field of range of detector unit 10. As noted above, this number may be assumed for purposes of illustration to be 32 for personnel movement across a given field of range. Such a count may be obtained by selecting the proper number of counting stages such as by connecting five bistable multivibrators in a binary ripple counter. The multivibrators may be transistor circuits with collector triggering which may reset in parallel through suitable diode coupling to a common reset bus. When precounter 36 has counted the preselected number of seismic movements, the next initial pulse triggers master counter 38 and resets precounter 36.

Master counter 38 may utilize the same type of bistable multivibrators as precounter 36. The number of multivibrators used should be sufficient to accumulate a sufficient number of counts to represent the total number of man-associated intrusions within the field of range of detector unit 10. A typical master counter may include seven bistable multivibrators, having the capability of counting 64 precounter pulses or man-associated intrusions.

When detector unit 10 receives the proper multifrequency signal code from interrogator unit 11 through command receiver 29 and decoder 30, the current pulse count accumuation in master counter 38 may be converted to an audio frequency signal by a suitable voltage controlled oscillator 42. Each stage of master counter may be connected to a different resistor of a voltage divider circuit 44 which may in turn be connected to voltage controlled oscillator 42. As the number of counts received by master counter 38 increases, the change in state of each counter stage may short out the resistor associated therewith in voltage divider 44 varying the voltage input to oscillator 42. Oscillator 42 may in turn be set to oscillate at different, distinct audio frequencies for each voltage level output of voltage divider 44. Using seven counter stages as noted above, typical audio signals which may be generated and coupled to modulator and transmitter 18 through terminal 46 representing the current total count in master counter 42 are as follows;

| Count | Frequency (Hz) |
|---|---|
| 0 | 437 |
| 1 | 568 |
| 2–4 | 747 |
| 4–8 | 968 |
| 8–16 | 1250 |
| 16–32 | 1620 |
| 32–64 | 2140 |
| Greater than 64 | 2800 |

In order to conserve power, as noted above, voltge controlled oscillator 42 may be disconnected from the power supply during the normal sensing mode. When the proper multifrequency code has been monitored be decoder 30, oscillator 42 may be turned on by decoder 30 through terminal 48 and the current total count transmitted to the interrogator unit. Reset amplifier 50 may also be turned on by decoder 30 resetting precounter 36 and master counter 38 to zero after oscillator 42 has generated its signal or after the interrogator unit 11 has received and processed the tone coded signal. Oscillator 42 and reset amplifier 50 may then be turned off.

After the audio frequency signal has been transmitted to and received by interrogator unit 11 as a modulated carrier radio wave and demodulated by receiver 20 back into an audio frequency signal, the signal may be converted to a visual indication of the current total count stored in master counter 38 by decoder and readout 23. In FIG. 3, decoder and readout 23 includes a suitable trigger circuit 52, such as a Schmitt trigger circuit, for converting the incoming audio frequency signal at terminal 54 from a sine wave to pulses having the same repetition rate as the audio frequency signal. The pulse signal may be fed simultaneously to a plurality of count-rate circuits 56, one count-rate circuit for each audio frequency generated by oscillator 42 (for the example given above, count-rate circuits 1 through 8 are used as shown). Each count-rate circuit 56 drives an indicator, such as lights 58 (one light designated for each count level as indicated), when the pulse frequency of the trigger pulse exceeds a preset rate. Each count-rate circuit indicator drive signal may be used to inhibit (as shown) the next lower frequency count-rate circuit so to allow only the light representing the highest number or count to be lit at one time. In order to compensate for any change in characteristics of oscillator 42 or count-rate circuits 56 it may be desirable to adjust the count-rate circuits to a threshold frequency (minimum frequency required to turn lights 58 on) such as;

| Count | Frequency (Hz) |
|---|---|
| 0 | 366 |
| 1 | 497 |
| 2 | 668 |
| 4 | 905 |
| 8 | 1175 |
| 16 | 1475 |
| 36 | 1933 |
| 64 | 2593 |

Indicators 58 may be reset by automatic or manual reset means such as by reset amplifier or switch 59.

A typical count-rate circuit 56, as illustrated in FIG. 4, may include a monostable multivibrator 60 and a suitable integrator 62 such as a series RC integration circuit. Monstable multivibrator 60 may be repetitively triggered by the pulse wave output from trigger circuit 52 at terminal 64. Multivibrator 60 may in turn generate a pulse for each trigger pulse having a preselected constant pulse width. The multivibrator 60 pulses may be coupled to integrator 62 where a charge or voltage may be accumulated in the RC circuit proportional to the trigger rate. If the trigger rate is sufficient for the particular count-rate circuit, the voltage accumulated in the RC circuit may be sufficient to energize indicator light 58.

FIG. 5 illustrates a typical decoder circuit which may be used for decoder 30 in FIG. 1. The input signal at terminal 66 of decoder 30, which may be the output of command receiver 29 and includes a composite waveform having one or more of the code frequency components, such as those given previously, may be simultaneously coupled to a plurality of suitable filter networks 68, one for each code frequency. Each filter 68 may include an amplifier with a conventional parallel or twin-T feedback filter coupled to detector and trigger circuits 70 which may in turn be connected to logic circuit 72. Logic circuit 72 provides an output when the proper combination of code frequencies are present in the composite wave form. The desired code frequency combination may be preset into decoder 30 by closing suitable grounding switches or plug 74.

A typical logic circuit 72 may include a logic channel for each code frequency each of which may be connected to a particular ground switch. If the switch is closed at plug 74 and if the that particular code frequency is present, the output of that logic channel may be positive. Conversely, if the switch is open and the code frequency not present, the output of that logic channel may also be positive. All channel outputs may be combined in an "and" gate so that an output may be produced when all channel outputs are positive. The "out" gate output may drive a signal generator 76, such as a monostable multivibrator, to apply power through terminal 78 to transmitter 18 and oscillator 42 of scaler 15 and to remove power from command receiver 29.

A large number of detector units 10 and their corresponding field of range may be monitored by a single interrogator unit 11 from either a fixed station or movable station, such as an aircraft, and thus keep a large area under surveillance without physical access to the detector unit. The detector units may be separately interrogated when desired so as to obtain a count of the man-associated intrusions within the detector unit's field of range during the preceding counting period.

The detector units may be used singly or in groups to obtain a desired surveillance pattern. For instance, if two detectors are emplaced a given distance apart and interconnected so that virtual seismic signal coincidence is required, the detectors may monitor a narrow area between and perpendicular to a line connecting the detectors. If the same detectors are interconnected so that one detector must be triggered before the other within a specified gate width, the detectors may monitor an outwardly extending triangular area, the apex of which lies on a line passing through both detectors.

It will be understood that various changes in the details, materials and arrangements of the parts, which have been herein described and illustrated in order to explain the nature of the invention, may be made by those skilled in the art within the principles and scope of the invention as expressed in the appended claims.

What is claimed is:

1. A surveillance system for monitoring man-associated seismic movements within a control area, comprising: means for generating an electrical signal responsive to seismic movement of the generating means; a bandpass amplifier coupled to said generating means and having a bandpass between about 10 and 40 Hz to permit electrical signals representative of man-associated movements to pass; threshold detector means for sensing signals from said bandpass amplifier exceeding a preselected voltage level greater than signals generated within said area by normal background noise within the bandpass range and for generating a pulse coicident with the first cycle of the seismic signal each time said voltage level is exceeded; inhibitor circuit means for generating pulses responsive to said detector means output pulses separated by more than a given time period; precounter means responsive to said trigger pulses for generating a resultant pulse when a preselected number of trigger pulses have been counted representing each man-associated intrusion into said control area; counter means for counting said resultant pulses and for generating a volage proportional to the total count in said counter means; normally disabled variable frequency oscillator means for generating an audio frequency signal proportional to the amplitude of said counter voltage; means for enabling said oscillator means and for monitoring the resulting audio frequency signal to determine the number of man-associated seismic movements within said area.

2. The system of claim 1 wherein said enabling and monitoring means includes a readout means for converting said audio frequency signal to an indication of the total count in said counter means.

3. The system of claim 2 including first radio wave means for transmitting said audio signal to said readout means at a location remote from said generating means.

4. The system of claim 3 having a second radio wave means coupled to said readout means including code signals generating means and wherein said enabling and monitoring means include code signal decoding means.

5. The system of claim 4 wherein said code signal generating means includes means for generating a multifrequency composite waveform of preselected frequencies and said decoding means includes means for separating said composite waveform into its separate frequencies, logic means for comparing these frequencies with preselected code frequencies to determine if the code signal includes the preselected code frequencies and means for enabling said variable frequency oscillator means and a portion of said radio wave means.

6. The system of claim 2 wherein said variable frequency oscillator means generates a preselected one of a plurality of frequencies for a given counter voltage and said readout means includes a count-rate circuit and visual indicator for each of said frequencies.

7. The system of claim 6 wherein each of said count-rate circuits includes a monostable multivibrator pulse width and a integrating RC circuit having a time constant dependent on the frequency to be measured by its associated count-rate circuit.

8. The system of claim 2 wherein said readout means includes a transducer for converting said audio frequency signal to sound waves.

* * * * *